United States Patent [19]

Craven

[11] Patent Number: 5,097,617
[45] Date of Patent: Mar. 24, 1992

[54] APPARATUS FOR MEASURING FISH

[76] Inventor: Gene C. Craven, 3305 N. Weller, Springfield, Mo. 65803

[21] Appl. No.: 640,093

[22] Filed: Jan. 11, 1991

[51] Int. Cl.$^5$ .................. A01K 97/00; B43L 7/00
[52] U.S. Cl. ............................. 43/4; 33/511; 33/485
[58] Field of Search .......... 43/4; 206/0.81, 0.8, 206/315.11, 822, 563, 45; 220/574; 33/511, 555.3, 555.1, 474, 483, 485, 494, 712

[56] References Cited

U.S. PATENT DOCUMENTS

| 111,254 | 9/1938 | Gugenheim | 220/574 |
|---|---|---|---|
| 202,545 | 4/1878 | Holmes | 206/0.81 |
| 656,413 | 8/1900 | Meux | 33/485 |
| 1,762,458 | 6/1930 | Wichert | 206/0.81 |
| 2,302,861 | 11/1942 | Hinkel | 206/0.8 |

FOREIGN PATENT DOCUMENTS

| 0070454 | of 0000 | Fed. Rep. of Germany | 206/0.81 |
|---|---|---|---|
| 2588446 | 4/1987 | France | 33/511 |

*Primary Examiner*—Kurt Rowan
*Assistant Examiner*—James Miner
*Attorney, Agent, or Firm*—Shook, Hardy & Bacon

[57] ABSTRACT

An elongated, upwardly opening V-shaped trough for measuring fish. The trough has spaced apart indicia at measured intervals from one closed end of the trough for indicating the length of a fish placed in the trough. Auxiliary indicia are placed at appropriate distances along the trough to signify the legal limit for various species of fish likely to be encountered by a fisherman.

5 Claims, 1 Drawing Sheet

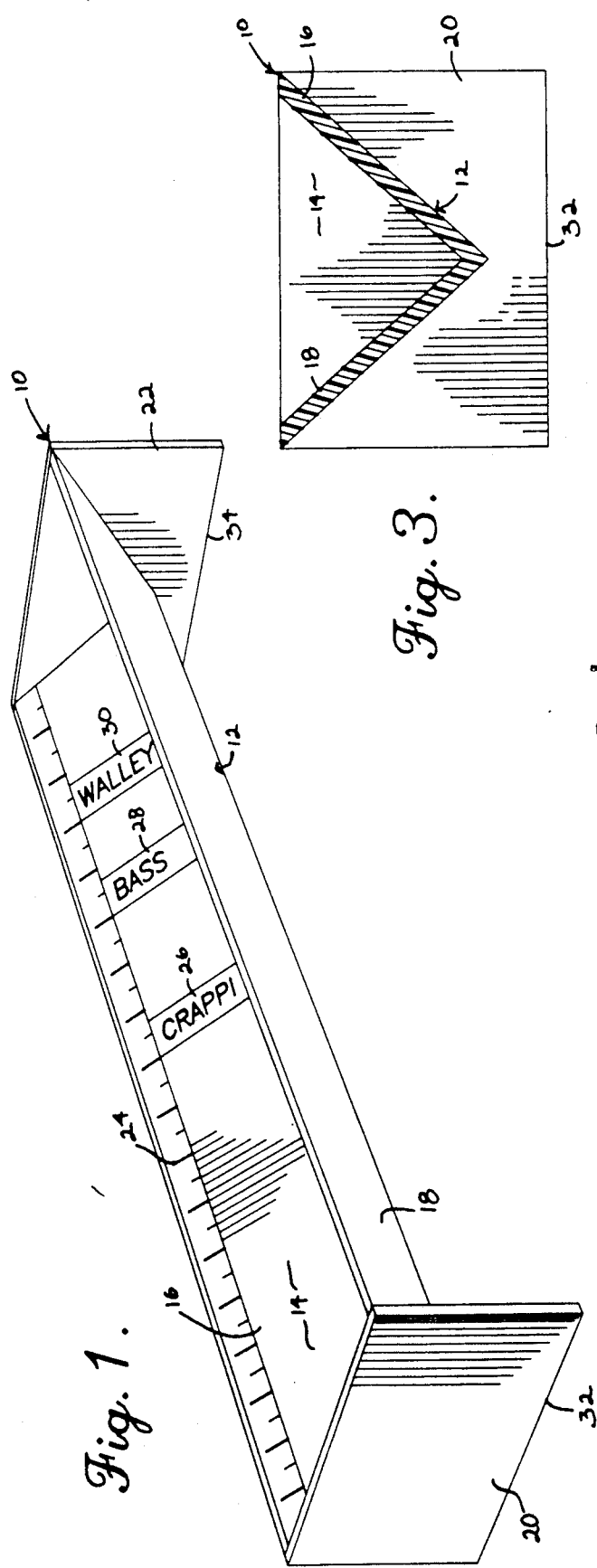
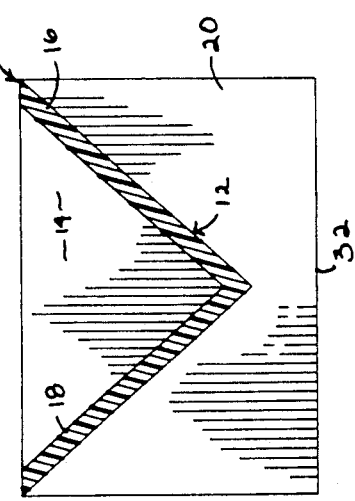
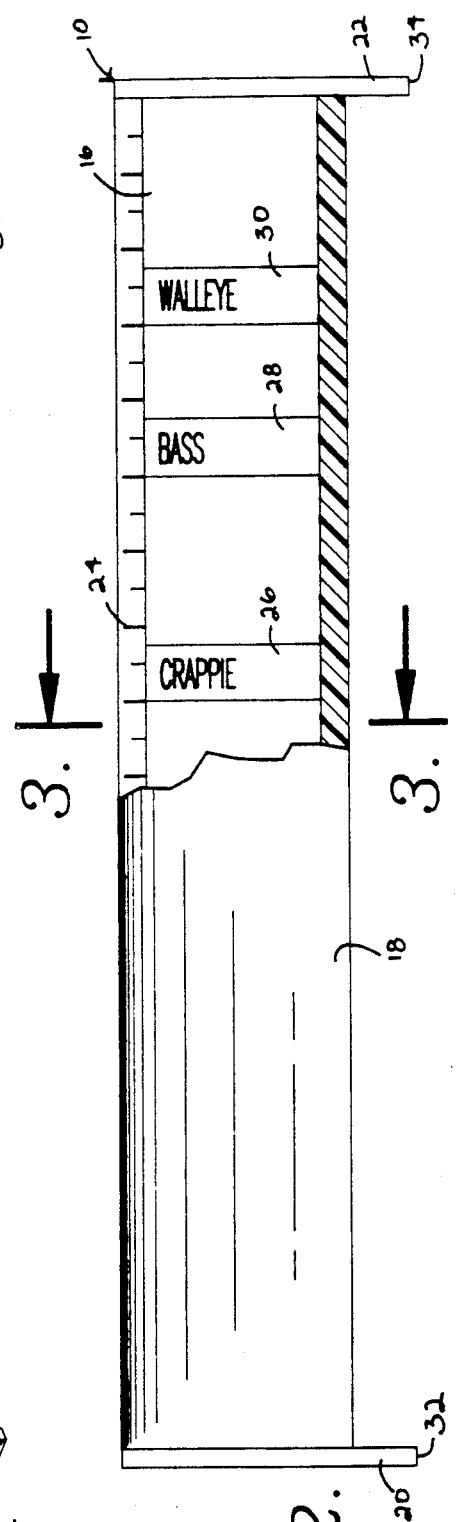
Fig. 1.
Fig. 3.
Fig. 2.

APPARATUS FOR MEASURING FISH

This invention pertains to equipment to be used by a fisherman, and more particularly to an apparatus for measuring the length of fish.

The fishing laws and regulations for most jurisdictions prescribe certain length limitations for fish which may be legally taken by fishermen. Such laws and regulations are felt to be very necessary to permit the effective management of fish population and to insure that fish as a resource for recreation or other purposes shall not be unnecessarily depleted.

The importance placed on fish management restrictions by the governmental agencies involved is underscored by the relative severity of the penalties regularly imposed on offenders who do not abide by the restrictions and by the vigilance with which the restrictions are enforced. Any fisherman found by an enforcement officer with fish which do not comply with appropriate restrictions is liable to lose the right to fish or to be severely fined, or both.

It is, therefore, necessary for fishermen to insure that the fish which they catch and retain comply with length of catch limits. These limits are often different for different fish species. This complicates the problem faced by the fishermen of checking each fish caught to insure that it meets legal requirements. The fisherman must keep ever in mind the established legal length for each species.

A caught fish must be measured immediately after it is caught so that it can be returned alive to the fishing waters should it prove to be smaller than permitted. The flapping of live fish exacerbates the problem of obtaining accurate measurements. Wet, slimy fish are difficult to hold and even harder to hold in a fixed position long enough to obtain a measurement.

Accordingly, it is an important object of the present invention to provide an apparatus that may be used by a fisherman to significantly ease the problems associated with accurately measuring caught fish.

In the accomplishment of the foregoing object, it is another object of this invention to provide an apparatus for measuring fish which may be easily and conveniently used by the fisherman and which serves to restrain and retain the fish while its measurement is taken.

Another important object of the present invention is to provide a fish measuring apparatus which visually displays the appropriate legal limit for the various species of fish likely to be caught by a fisherman so that the fisherman is not required to memorize the limits and mistakes are not likely to occur.

A further object of this invention is to provide a convenient fish measuring apparatus which is subject to relatively economical fabrication from readily available materials and which can be easily cleaned and stored following use.

These and other important aims and objectives of the present invention will be further explained or will become apparent from the following description and explanation of the figures of the drawing.

In the drawing:

FIG. 1 is a perspective view of an apparatus embodying the principles of this invention;

FIG. 2 is a side elevational view of the apparatus of Fig. 1, parts being broken away and shown in cross-section to reveal details of construction; and FIG. 3 is a detailed cross-sectional view taken along line 3—3 of FIG. 2.

Apparatus embodying this invention is broadly designated in the drawing by the reference numeral 10. Apparatus 10 includes a side wall 12 which defines an elongated upwardly opening cavity 14. Specifically, side wall 12 in the embodiment illustrated in the drawing comprises a pair of elongated, rigid, planar members 16 and 18 disposed with an elongated, straight edge of each member adjacent the corresponding edge of the other member. The members are positioned to diverge from each other at an angle to present a V-shaped trough with the cavity of the trough tapering uniformly to a greater dimension as the top of the trough is approached.

In the preferred embodiment, the members 16 and 18 are of equal length and each end of the trough is closed by its corresponding elongated, rigid, planar end member 20 and 22 respectively. Members 20 and 22 are spaced apart the length of the cavity or trough 14 as shown in the drawings. Each member extends transversely across the trough, closing the corresponding ends of the latter. Preferably, the juncture between the side members 16 and 18 and the junctures of the side members and the end members 20 and 22 are sealed to prevent the inadvertent escape of liquid from the trough.

At least one of the inwardly facing, flat major surfaces of member 16 or 18 is provided with a series of spaced apart, measuring indicia 24 prominently imprinted or otherwise fixedly displayed on the surface. Indicia 24 are positioned at measured distances from one end 20 of the trough.

Secondary indicia 26, 28 and 30 are each also disposed at measured distances from end 20 of the trough and contain identifying letters or symbols corresponding to various species of fish likely to be caught by a fisherman in a given area. In the embodiment illustrated, the actual species names are printed on the surface. Manifestly, each of the indicia 26-30 is appropriately positioned at the precise distance from end 20 which corresponds to the legal length for the species o fish indicated by the respective indicia.

In use, apparatus 10 is taken by the fisherman to the fishing site. This may be a boat, but could also be a fishing location along the shore of a body of water such as a lake, river, stream or the like. When the fisherman catches a fish, he simply places it in trough 14 with one end of the fish adjacent end 20.

The fish is held in the trough by gravity and the converging sides of the trough assist in insuring that the fish is urged by gravity to a position where its measurement can be readily taken. Flopping of the fish can be relatively easy restrained by the fisherman while the latter is in the trough The length of the fish can, of course, be conveniently ascertained visually. Further, the fisherman can quickly and easily identify the appropriate legal length with the species of fish caught to ascertain whether or not the fish complies with legal limits. If not, the fish can be readily returned to the fishing water by the fisherman.

Preferably, apparatus 10 is constructed from relatively light weight, durable plastic material The elongated bottom edges 32 and 34 for the end members 20 and 22 are parallel and provide appropriate feet for supporting trough 14 on any available suitable surface. The end members 20 and 22 are preferably sized so that edges 32 and 34 extend well below the bottom of trough 14 as illustrated in the drawings.

While apparatus 10 might be constructed with drain holes or the like in the bottom of the trough, it is preferred that the trough be waterproof. Accordingly, any water brought into the trough while measuring a fish can be retained in the trough until it is convenient for the fisherman to manually manipulate the apparatus to dump the water from the trough. It is preferred that apparatus 10 be constructed of relatively waterproof material so that the trough can be immersed and readily washed after use before the apparatus is placed in storage.

It will be readily understood that apparatus 10 could be constructed with only one end member if desired. Further, while it is desirable that trough 14 gradually widen as the top of the trough is approached, it is not absolutely essential that the cross-sectional configuration of the trough be V-shaped. On the contrary, the trough could, for example, have a generally arcuate cross-sectional configuration and it would still be useful for the fish measuring operation described herein.

Other modifications of the apparatus from the embodiment chosen for illustration will suggest themselves to those skilled in the art without departing from the concept disclosed herein. It is intended that all obvious variations be included in the following claims.

Having thus described the invention, I claim:

1. Apparatus for measuring fish comprising:
   a pair of elongated, relatively rigid members, each having an elongated edge and a planar surface, said members being disposed with said elongated edges of the respective members positioned adjacent to each other and the planar surfaces of the members being disposed at acute angles with respect to vertical and diverging from each other to present an elongated, upwardly opening V-shaped trough;
   an elongated, generally planar end piece for each end of said trough, said end pieces being spaced apart and disposed to extend transversely across the trough at the respective ends of the trough to close the ends of the latter and present an upwardly opening V-shaped cavity adapted to receive therein a fish to be measured; and
   an elongated series of indicia disposed on the planar surface of one of said members and in the cavity, said indicia being spaced at measured intervals longitudinally of the trough whereby the length of said fish may be visually determined when the fish is in said cavity.

2. Apparatus as set forth in claim 1, each end piece being secured to said members, said end pieces extending beyond said members in a direction opposite the open top of said trough, each end piece having an edge adapted to engage a supporting surface for supporting the trough in a generally horizontal position, the indicia being at intervals measured from one of said end pieces.

3. Apparatus as set forth in claim 2, said end pieces extending substantially equal distances beyond said members.

4. Apparatus as set forth in claim 1, and
   auxiliary indicia on the planar surface associated with said series of indicia and positioned with respect to at least one indicia of said series a predetermined distance corresponding to a specific distance.

5. Apparatus as set forth in claim 4, said auxiliary indicia being formed to visually indicate a particular fish species, said predetermined distance being a distance corresponding to a certain length of a fish of said species.

* * * * *